United States Patent
Sankaran et al.

(10) Patent No.: US 7,814,364 B2
(45) Date of Patent: Oct. 12, 2010

(54) ON-DEMAND PROVISIONING OF COMPUTER RESOURCES IN PHYSICAL/VIRTUAL CLUSTER ENVIRONMENTS

(75) Inventors: Ananda C. Sankaran, Austin, TX (US); Sumankumar Singh, Pflugerville, TX (US); Bharath Vasudevan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 390 days.

(21) Appl. No.: 11/514,026

(22) Filed: Aug. 31, 2006

(65) Prior Publication Data

US 2008/0126834 A1    May 29, 2008

(51) Int. Cl.
*G06F 11/00* (2006.01)

(52) U.S. Cl. .......................................... 714/4
(58) Field of Classification Search ........... 714/3, 714/4

See application file for complete search history.

(56) References Cited

U.S. PATENT DOCUMENTS

| | | | |
|---|---|---|---|
| 7,418,633 B1* | 8/2008 | Salpekar et al. | 714/43 |
| 7,475,274 B2* | 1/2009 | Davidson | 714/4 |
| 7,581,220 B1* | 8/2009 | Roeck | 718/100 |
| 7,721,138 B1* | 5/2010 | Lyadvinsky et al. | 714/4 |
| 2002/0013802 A1* | 1/2002 | Mori et al. | 709/1 |
| 2003/0018927 A1* | 1/2003 | Gadir et al. | 714/4 |
| 2004/0243650 A1* | 12/2004 | McCrory et al. | 707/203 |
| 2005/0108593 A1* | 5/2005 | Purushothaman et al. | 714/4 |
| 2005/0120160 A1* | 6/2005 | Plouffe et al. | 711/1 |
| 2005/0125557 A1 | 6/2005 | Vasudevan et al. | |
| 2005/0132379 A1 | 6/2005 | Sankaran et al. | |
| 2005/0149684 A1 | 7/2005 | Sankaran et al. | |
| 2005/0283636 A1 | 12/2005 | Vasudevan et al. | |
| 2006/0015773 A1 | 1/2006 | Singh et al. | |
| 2006/0069761 A1 | 3/2006 | Singh et al. | |
| 2009/0177915 A1* | 7/2009 | Dominic | 714/4 |

* cited by examiner

*Primary Examiner*—Scott T Baderman
*Assistant Examiner*—Yair Leibovich
(74) *Attorney, Agent, or Firm*—Larson Newman & Abel, LLP

(57) ABSTRACT

A server cluster comprises a physical node and a virtual host node. The physical node includes an active node running an application. The virtual host node includes an inactive virtual node. The virtual node is activated upon failure of the active node and the application is failed over to the virtual node.

20 Claims, 2 Drawing Sheets

ON-DEMAND PROVISIONING OF COMPUTER RESOURCES IN PHYSICAL/VIRTUAL CLUSTER ENVIRONMENTS

FIELD OF THE DISCLOSURE

This disclosure relates generally to information handling systems, and relates more particularly to computer network server clusters.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computers, including servers and workstations, are often grouped into computer networks, including networks having a client-server architecture in which the servers access storage, including shared storage, in response to requests from client computers of the network. The servers of a computer network may include one or more virtual operating systems running on the host operating system and the host software of the server. Each virtual operating system comprises a virtual machine. Multiple virtual machines may be included on a single physical server. The presence of one or more virtual machines on a single physical machine provides a separation of the hardware and the software of the computer system. Each virtual machine could be dedicated to the task of handling a single function. As an example, one virtual machine could be a mail server, while another virtual machine present on the same physical server could be a file server.

A server cluster is a group of independent servers that is managed as a single system and is characterized by higher availability, manageability, and scalability, as compared with groupings of unmanaged servers. A server cluster typically involves the configuration of a group of independent servers such that the servers appear in the network as a single machine or unit. Server clusters are managed as a single system, share a common namespace on the network, and are designed specifically to tolerate component failures and to support the addition or subtraction of components in the cluster in a transparent manner. At a minimum, a server cluster includes two or more servers, which are sometimes referred to as nodes, that are connected to one another by a network or other communication links.

Failure recovery of business applications running on enterprise servers has been addressed through solutions such as hot standby solutions, backup/restore operations, and failover clustering. Failover clustering provides an automated mechanism for restarting applications by failing them over to a passive server and restarting the application. Failover clusters deploy passive server machines to take over failures from active servers. These passive servers, which are either physical or virtual machines, continue to consume physical and logical resources while they wait for failures to happen.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
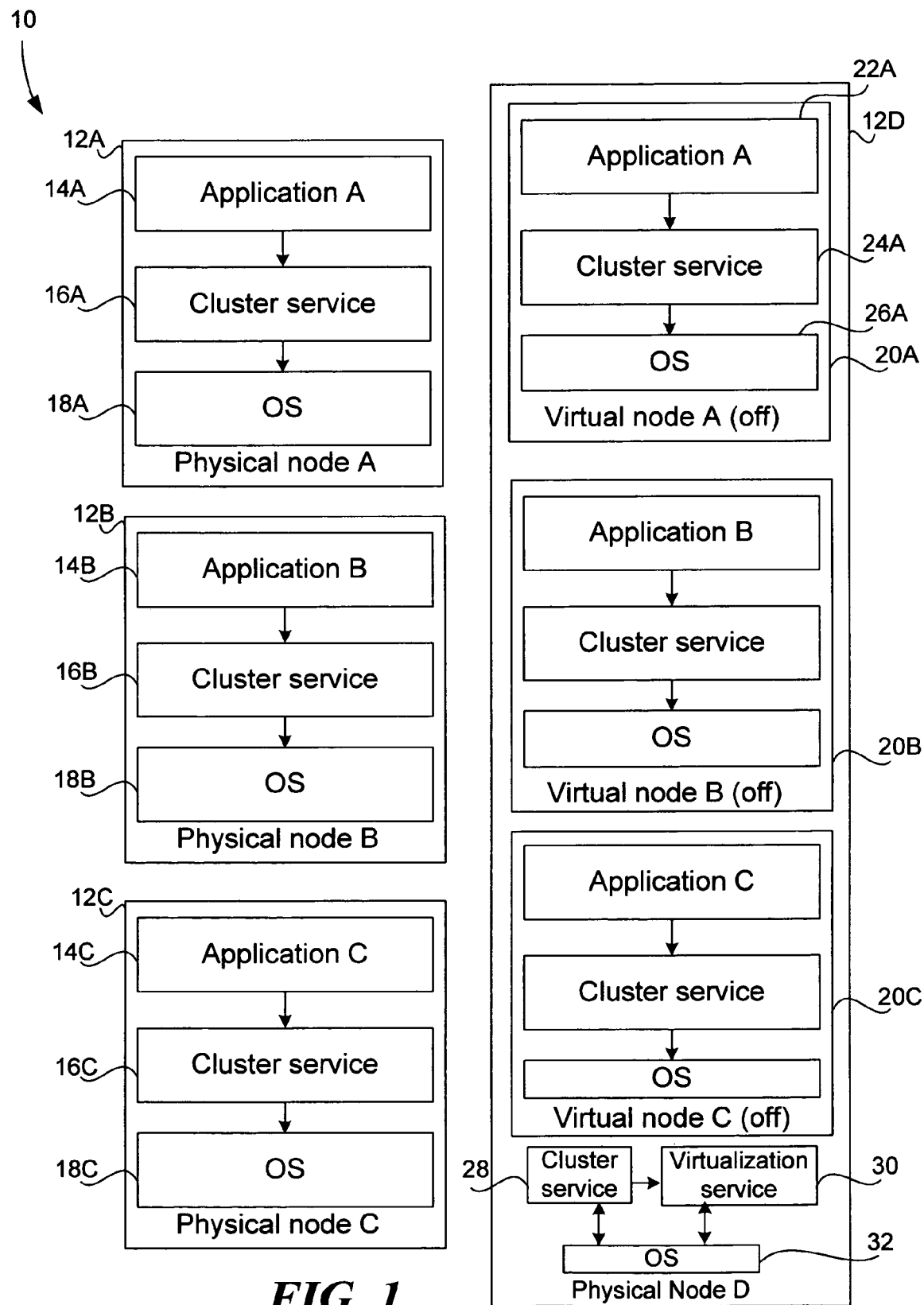
FIG. 1 is a schematic view of a computer server cluster in a first mode.

FIG. 1 shows a computer server cluster 10 for an information handling system. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Server cluster 10 includes physical nodes 12A, 12B, 12C and 12D. Physical nodes 12A, 12B and 12C include respective applications 14A, 14B and 14C, as well as respective cluster services 16A, 16B and 16C. The physical nodes 12A, 12B and 12C also include their own operating system, which is identified at 18A with respect to Physical Node A, 18B with respect to Physical Node B, and 18C with respect to Physical Node C. The physical nodes 12A, 12B, 12C and 12D share external storage (not shown) such as SCSI, iSCSI, SAS or Fibre Channel based storage.

Physical Node 12D hosts a plurality of virtual machines or nodes 20A, 20B and 20C. Each virtual node includes application(s), a cluster service with clustering software, and an operating system. Thus, Virtual Node A (20A) includes application(s) 22A, cluster service 24A, and operating system 26A. Physical Node 12D also includes its own cluster service 28, a virtualization service 30, and an operating system 32, all of which communicate with each other. Physical Node 12D is a member of the server cluster 10 whose role is to enable the Virtual Nodes. The cluster service 28 on the physical node 12D coordinates with the virtualization service 30 to turn on appropriate virtual nodes. For this purpose the cluster service 28 gets the list of cluster nodes (20A, 20B, 20C) that are hosted as virtual machines in the physical node 12D from the virtualization service 30. This list is maintained in the cluster database. The cluster service 28 performs this interaction with virtualization service in addition to normal clustering functions such as enabling physical node 12D to participate in the cluster and detecting failures. The virtualization service 30, besides providing virtualization functions, also provides ability to receive requests from cluster service 28 to turn on or off the virtual cluster nodes hosted by it and to provide configuration information. The cluster service 28 and virtualization service 30 automatically recognize that they are running on the same system and facilitate communications with each other. Both services are designed recognize each other's presence if they are installed on the same computer system.

Each physical node 12 is associated with a virtual node 20. Thus, physical Node A (12A) is associated with Virtual Node A (20A); Physical Node B (12B) is associated with Virtual Node B (20B); and Physical Node C (12C) is associated with Virtual Node C (20C). This association is defined by the application that can be hosted either by the physical node or the virtual node (i.e., physical node 12A and virtual node 20A are associated by the application A that both of them are configured to host), but at any point in time only one of them will be hosting the application. The virtual nodes 20A, 20B and 20C are powered off and inactive by default, and thus do not consume system resources on physical node 12D. The virtual nodes 20A, 20B, 20C are represented in the cluster as being in a "Warm Standby" state. The physical nodes 12A, 12B, 12C, 12D are represented in the cluster as being in an "Online" state. In the event of a failure of an active application hosting node such as Physical Node A, the cluster service 28 and the virtualization service 30 on the virtual node host 12D coordinate to provide on-demand provisioning of virtual machine resources. The cluster service 28 recognizes the failure, and consults the cluster database to determine the appropriately associated and configured virtual node that can take over hosting Application A 14A, (i.e., virtual node 20A). The cluster service 28 then interacts with the virtualization service 30 on the virtual node host 12D to turn on the appropriate virtual node 20A.

Figure 2:
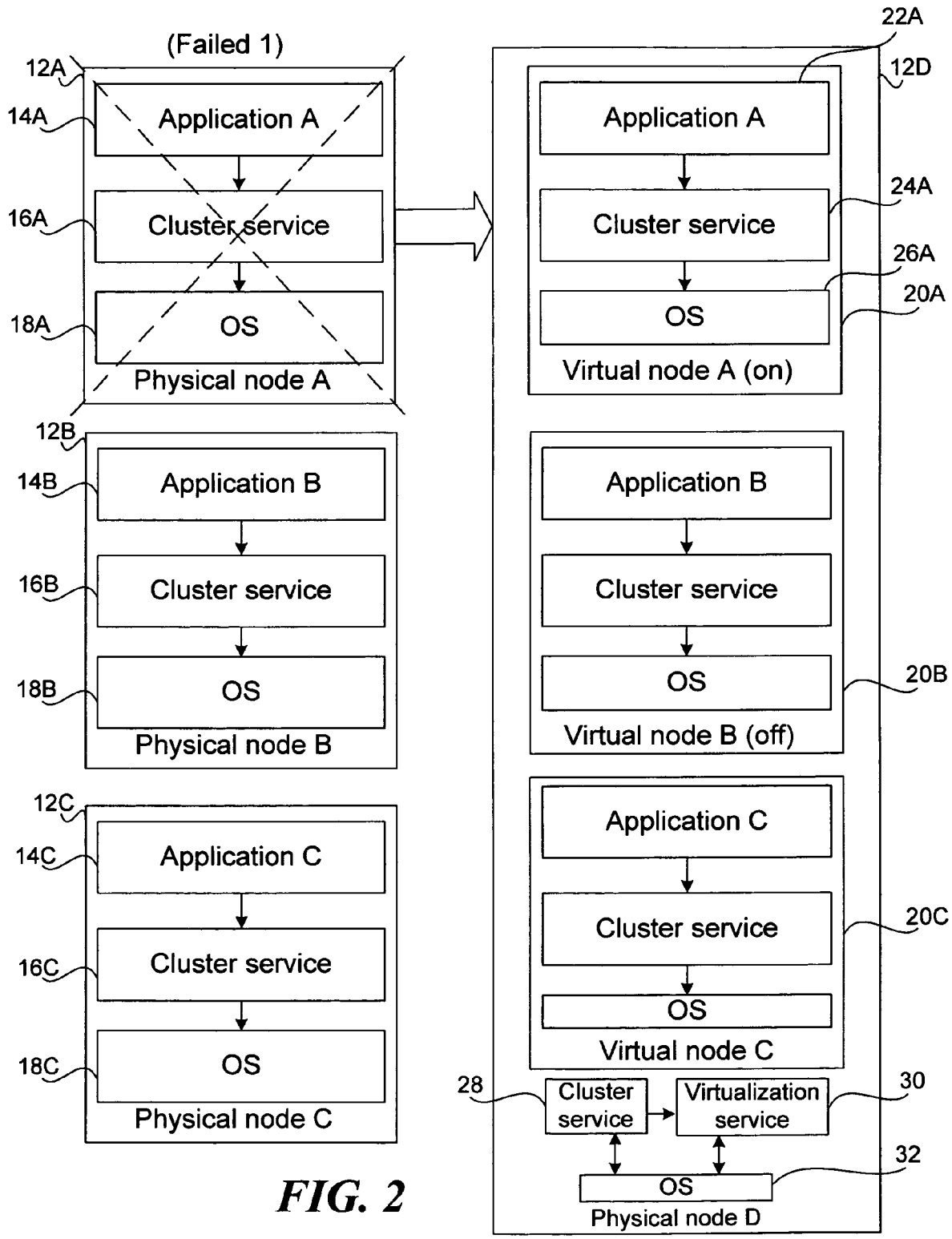
FIG. 2 is a schematic view of the computer server cluster in a second mode.

The determination of which cluster nodes are preferred owners of applications is accomplished by assigning a prioritized node affinity to each cluster application A, B, C. In one embodiment, the fail-over affinity for each application on an active node is set first to the physical server on which the application resides, then to the corresponding passive virtual node, and finally to the virtual node host. Thus, when physical node 12A fails, virtual node 20A is not active, so the resource fails over to node 12D. As shown in FIG. 2, the cluster service 28 on node 12D pauses the application, and starts virtual machine 20A by interacting with virtualization service 30. Once virtual node 20A is operational, the failover of the application to the new virtual node is initiated and start up routines are triggered such that the resource automatically fails over to virtual node 20A and the cluster service on the virtual node appropriately joins the cluster. Because the virtual node 20A has a higher affinity than the virtual node host 12D, the application is moved to the virtual node 20A to complete the failover process. If for some reason the application does not failover successfully to the virtual node, these steps can be repeated.

Alternatively, the virtual node host 12D may be set to have a higher affinity than the virtual node 20A. In this embodiment, the application affinity is set first to the physical node 12A, then to the virtual node host 12D, and then to the virtual node 20A. If the physical node 12A fails, the application thus fails directly to the virtual node host 12D. The cluster service 28 on node 12D then pauses the application and starts the virtual machine 20A. This is because the host node 12D realizes that it is not configured to host application A and from the cluster database determines that virtual node 20A is indeed configured to host application A. Thus physical node 12D starts virtual machine 20A so that the application can fail-over to it. Once node 20A is operational, the application automatically fails over to the node 20A.

Any additional time required to bring the appropriate virtual node online is minimal compared to the time taken for the entire application failover to complete, because typical enterprise file sharing applications such as SQL or Exchange in production environments go through a time-consuming recovery process before coming online after a failure. The present invention thus provides virtual machines that are only provisioned when required, for example after a hardware or software failure on the active node. The standby nodes do not consume processing power or memory resources as long as the active node is hosting applications. Also, the standby nodes do not incur additional electrical power and equipment cooling requirements in their normal inactive state.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A server cluster comprising:
a first physical node including a first active node running a first application, wherein the first application is assigned a first prioritized node affinity for the first physical node; and
a second physical node comprising:
a first virtual host node including an inactive first virtual node;
a virtualization service adapted to:
activate the first virtual node; and
determine a second prioritized node affinity for the first application, wherein the second prioritized node affinity has a lower priority than the first prioritized node affinity; and
a cluster service adapted to:
detect a failure of the first active node;
direct the virtualization service to activate the first virtual node upon failure of the first active node based upon the virtualization service determining that the second prioritized node affinity is for the first virtual node; and fail the first application over to the first virtual node after the first virtual node is activated;

wherein the cluster service and the virtualization service are adapted to automatically recognize the other's presence after both the cluster service and the virtualization service are installed at the second physical node.

2. The server cluster of claim 1, wherein the first physical node includes a plurality of active nodes.

3. The server cluster of claim 1, wherein the first virtual host node includes a plurality of inactive virtual nodes.

4. The server cluster of claim 1, wherein the first physical node includes a plurality of active nodes associated with a plurality of inactive virtual nodes at the second physical node.

5. The server cluster of claim 4, wherein each virtual node includes a hardware and software operating environment of the associated active node.

6. The server cluster of claim 1, further comprising a cluster service on the active node.

7. A server cluster comprising:
a first physical node including a plurality of active nodes each running an application, wherein each application is assigned a first prioritized node affinity for the first physical node; and
a second physical node comprising:
a virtual host node including a plurality of inactive virtual nodes, each inactive virtual node corresponding to an active node;
a virtualization service adapted to:
activate the virtual nodes; and
determine a second prioritized node affinity for each application, wherein the second prioritized node affinity for each application has a lower priority than each application's corresponding first prioritized node affinity; and
a cluster service adapted to:
detect a failure of a particular active node;
direct the virtualization service to activate a particular virtual node corresponding to the particular active node upon failure of the particular active node based upon the virtualization service determining that the second prioritized node affinity for the application running on the particular active node is for the particular virtual node; and
fail the application running on the particular active node over to the particular virtual node after the particular virtual node is activated;
wherein each of the cluster service and the virtualization service are adapted to automatically recognize the other's presence after both the cluster service and the virtualization service are installed at the second physical node.

8. The server cluster of claim 7, wherein each virtual node includes a hardware and software operating environment of the corresponding active node.

9. The server cluster of claim 7, further comprising a cluster service on the active node.

10. A method for provisioning a virtual machine in a server cluster, the method comprising:
providing a first physical node including a first active node running a first application, wherein the first application is assigned a first prioritized node affinity for the first physical node;
providing a second physical node comprising:
a first virtual host node including an inactive first virtual node;
a virtualization service adapted to:
activate the first virtual host node; and
determine a second prioritized node affinity for the first application, wherein the second prioritized node affinity has a lower priority than the first prioritized node affinity; and
a cluster service;
detecting a failure of the first active node:
directing the virtualization service to activate the first virtual node upon failure of the first active node based upon the virtualization service determining that the second prioritized node affinity is for the first virtual node; and
failing the first application over to the first virtual node after the first virtual node is activated;
wherein the cluster service is adapted to automatically recognize the presence of the virtualization service after the cluster service and the virtualization service are installed at the second physical node.

11. The method of claim 10, wherein the first physical node includes a plurality of active nodes.

12. The method of claim 10, wherein the first virtual host node includes a plurality of inactive virtual nodes.

13. The method of claim 10, wherein the first physical node includes a plurality of active nodes associated with a plurality of inactive virtual nodes at the second physical node.

14. The method of claim 13, wherein each virtual node includes a hardware and software operating environment of the associated active node.

15. The server cluster of claim 2, wherein:
the first physical node further includes a second active node running a second application, wherein the second application is assigned a third prioritized node affinity for the first physical server;
the second physical node further comprises a second virtual host node including an inactive second virtual node;
the virtualization service is further adapted to:
activate the second virtual node; and
determine a fourth prioritized node affinity for the second application, wherein the fourth prioritized node affinity has a lower priority than the third prioritized node affinity; and
the cluster service is further adapted to:
detect a failure of the second active node;
direct the virtualization service to activate the second virtual node upon failure of the second active node based upon the virtualization service determining that the fourth prioritized node affinity is for the second virtual node; and
fail the second application over to the second virtual node after the second virtual node is activated.

16. The server cluster of claim 1, further comprising:
a second physical node including a second active node running a second application, wherein the second application is assigned a third prioritized node affinity for the second physical server;
wherein:
the second physical node further comprises a second virtual host node including an inactive second virtual node;
the virtualization service is further adapted to:
activate the second virtual node; and
determine a fourth prioritized node affinity for the second application, wherein the fourth prioritized node affinity has a lower priority than the third prioritized node affinity; and the cluster service is further adapted to:
   detect a failure of the second active node;
   direct the virtualization service to activate the second virtual node upon failure of the second active node based upon the virtualization service determining that the fourth prioritized node affinity is for the second virtual node; and
   fail the second application over to the second virtual node after the second virtual node is activated.

17. The server cluster of claim 1, wherein:
the virtualization service is further adapted to determine a third prioritized node affinity for the first application, wherein the third prioritized node affinity has a higher priority than the second prioritized node affinity and a lower priority than the first prioritized node affinity; and
the cluster service is further adapted to fail the first application over to the first physical node based upon the virtualization service determining that the third prioritized node affinity is for the first physical node, in response to detecting the failure of the first active node and prior to directing the virtualization service to activate the first virtual node.

18. The method of claim 10, wherein further:
the first physical node includes a second active node running a second application, wherein the second application is assigned a third prioritized node affinity for the first physical node;
the second physical node comprises a second virtual host node including an inactive second virtual node;
the virtualization service is further adapted to:
   activate the second virtual node; and
   determine a fourth prioritized node affinity for the second application, wherein the fourth prioritized node affinity has a lower priority than the third prioritized node affinity; and
the method further comprises:
   detecting a failure of the second active node;
   directing the virtualization service to activate the second virtual node upon failure of the second active node based upon the virtualization service determining that the fourth prioritized node affinity is for the second virtual node; and
   failing the second application over to the second virtual node after the second virtual node is activated.

19. The method of claim 10, further comprising:
providing a second physical node including a second active node running a second application, wherein the second application is assigned a third prioritized node affinity for the first physical node, wherein:
   the second physical node further comprises a second virtual host node including an inactive second virtual node;
   the virtualization service is further adapted to:
      activate the second virtual node; and
      determine a fourth prioritized node affinity for the second application, wherein the fourth prioritized node affinity has a lower priority than the third prioritized node affinity;
detecting a failure of the second active node;
directing the virtualization service to activate the second virtual node upon failure of the second active node based upon the virtualization service determining that the fourth prioritized node affinity is for the second virtual node; and
failing the second application over to the second virtual node after the second virtual node is activated.

20. The method of claim 10, wherein further:
the virtualization service is further adapted to determine a third prioritized node affinity for the first application, wherein the third prioritized node affinity has a higher priority than the second prioritized node affinity and a lower priority than the first prioritized node affinity;
the method further comprising failing the first application over to the first physical node based upon the virtualization service determining that the third prioritized node affinity is for the first physical node, in response to detecting the failure of the first active node and prior to directing the virtualization service to activate the first virtual node.

* * * * *